United States Patent [19]

Yeasting

[11] 4,053,817
[45] Oct. 11, 1977

[54] ELECTROMAGNETIC VIBRATOR

[75] Inventor: Maynard Charles Yeasting, Elmore, Ohio

[73] Assignee: Rexnord Inc., Milwaukee, Wis.

[21] Appl. No.: 697,030

[22] Filed: June 17, 1976

[51] Int. Cl.² .......................................... H02K 33/14
[52] U.S. Cl. .................... 318/128; 318/132; 310/29; 198/769
[58] Field of Search .............................. 318/119–134; 198/769 R; 319/29

[56] References Cited

U.S. PATENT DOCUMENTS

| 2,287,223 | 6/1942 | Baird .................................. 310/29 X |
| 3,372,793 | 3/1968 | Redford et al. ...................... 198/769 |
| 3,648,136 | 3/1972 | Krajewski et al. .................. 318/128 |
| 3,706,018 | 12/1972 | Morris et al. ....................... 310/29 X |
| 3,748,553 | 7/1973 | Reiner .................................. 318/128 |
| 3,787,715 | 1/1974 | Eaton, Jr. ............................. 318/130 |

Primary Examiner—Donovan F. Duggan
Attorney, Agent, or Firm—Marshall & Yeasting

[57] ABSTRACT

An electromagnetic vibrator that is resonant at a frequency below one third of the frequency of an alternating current power source is driven by a linear electromagnetic motor, the airgap of which varies with the vibration of the vibrator, in which motor current flow from the power source is established during the first half cycle of the power line voltage that occurs after the airgap is a maximum, is maintained independently of the power source during at least a major portion of the next half cycle, and is reduced to zero during the next following half cycle of power source voltage. Preferably two electromagnetic motors are employed, one for each direction of relative motion between the vibrator parts.

8 Claims, 7 Drawing Figures

ELECTROMAGNETIC VIBRATOR

BACKGROUND OF THE INVENTION

Electromagnetcially driven vibrators are usually operated at the same frequency or double the frequency of the alternating current power supplied to the electromagnet constituting the feeder motor. Since most power systems operate at 60 Hz. or 50 Hz. the feeders operate at frequencies of 3000, 3600, 6000 or 7200 cycles per minute.

These frequencies are too high for good vibratory conveying, and the limitation of operation to precisely the stated frequencies requires that much of the electromagnetically generated force be used to synchronize the mechanical vibration to the operating frequency leaving only a small portion to do useful work. These feeders if tuned close to the operating frequency were very sensitive to changes in load, either overstroking at light or no load and stalling with increases in load over the design load.

SUMMARY OF THE INVENTION

According to the invention an electromagnetic vibrator has a work member to be vibrated coupled to an exciter member by resilient means to form a vibratory system having a natural frequency less than one third the frequency of an alternating current power source. The system is powered by a linear electromagnetic motor having cooperating parts of the two members. Semi-conductor switching means and a logic circuit responsive to the power source and to the vibration of the vibrator is arranged to establish a flow of motor current from a power line during the first half cycle of the power line voltage occurring after the air gap of the motor is a maximum, to maintain the current flow independently of the power source for at least part of the next half cycle of power line voltage, and to arrest the current flow in a subsequent half cycle.

The timing of the current supplied to the electromagnetic motor is determined by the mechanical vibration so that the system operates at the resonant frequency of the vibrator and practically all of the electromagnetically generated force is used to overcome friction and load losses in the system. Operation at less than one third the frequency of the conventional electromagnetic vibrator reduces the required spring force by nine to one as compared with the conventional vibrator, and the lower operating freuquency at correspondingly longer strokes provides better conveying action.

A preferred form of the invention is illustrated in the drawings:

DESCRIPTION OF A PREFERRED EMBODIMENT

Figure 1:
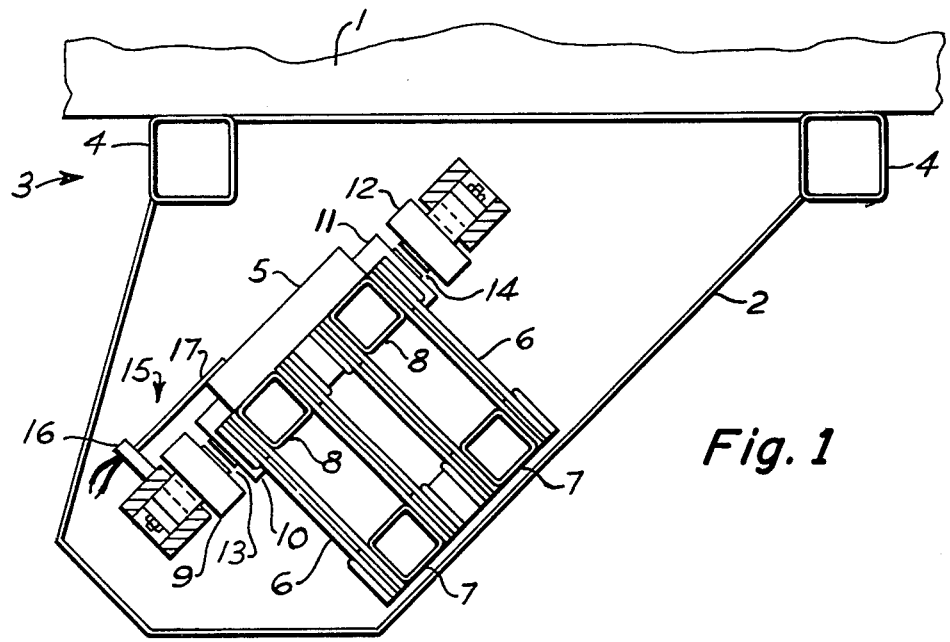
FIG. 1 is a simplified side elevation of a vibratory feeder embodying the invention.

A simple form of vibratory feeder embodying the invention is illustrated in FIG. 1. As shown, the feeder includes a trough 1 and downwardly extending side frames 2 constituting a work member 3 to be vibrated. The work member 3 includes a pair of cross members 4 to which support springs (not shown) are attached. An exciter 5 is supported on cantilever springs 6 attached to square tubes 7 extending between the side frames 2 of the work member 3 and to square tubes 8 of the exciter 5.

Two pairs of electromagnets 9, 10 and 11, 12 constituting electromagnetic motors are arranged with electromagnets 9 and 12 mounted from the side frames 2 and the electromagnets 10 and 11 mounted on the exciter 5. The motors have air gaps 13, 14 that vary in length with relative movement between the work member 3 and the exciter 5.

A signal transducer 15 comprises a coil 16 mounted from the side frame 2 to cooperate with a permanent magnet 17 mounted on the exciter 5 to generate an electrical voltage corresponding to the relative velocity of the exciter 5 with respect to the work member 3.

Preferably the weight of the exciter 5, including the parts rigidly attached thereto, is at least half the weight of the work member 3. The springs 6 are selected so that the natural frequency of vibration of the vibratory system of springs, work member and exciter is near but less than one third the frequency of alternating current power available to drive the system.

Figure 2:
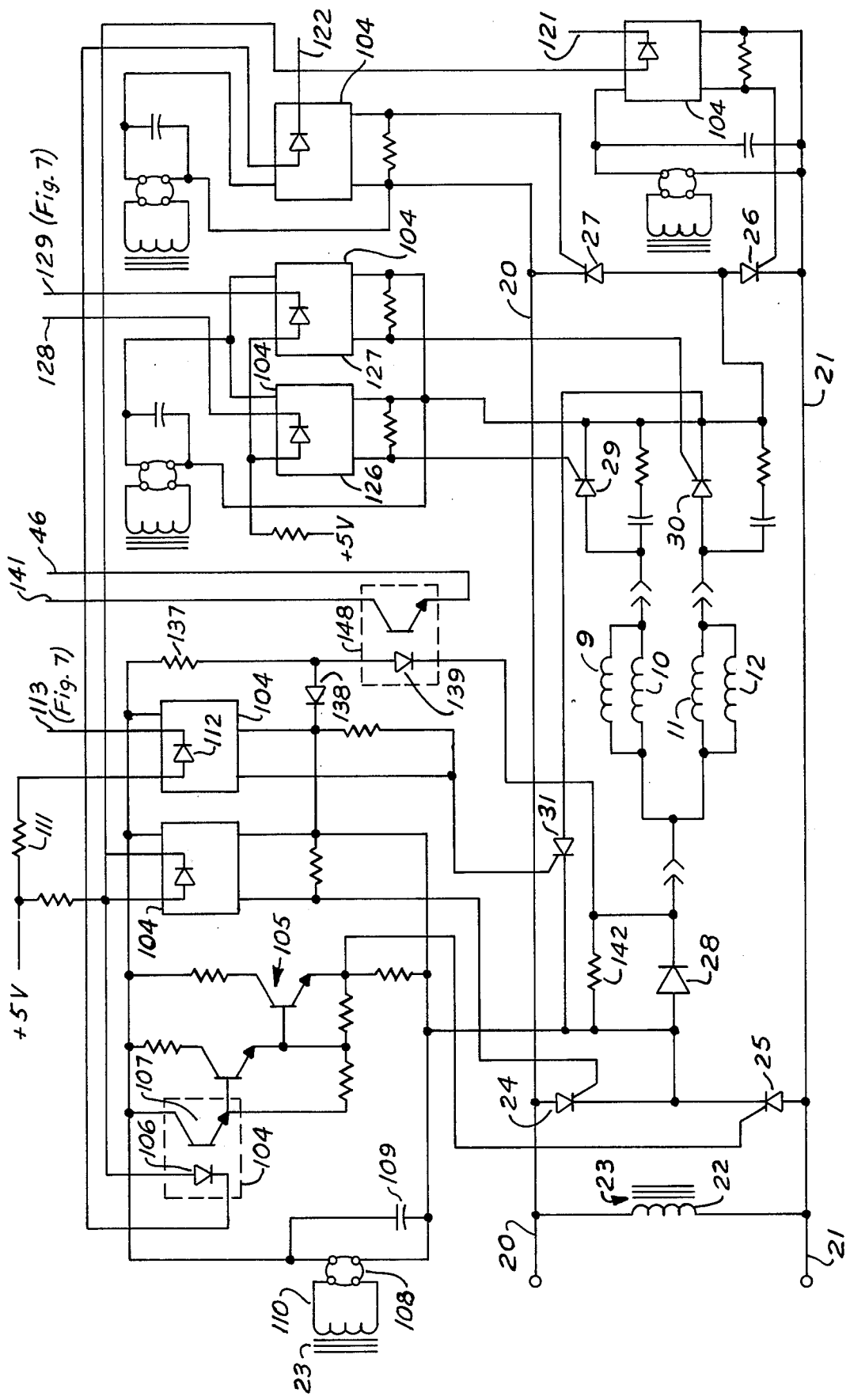
FIG. 2 is a circuit diagram of the semiconductor switching circuits that selectively connect the electromagnets to the power line.

The alternating current power to drive the system is supplied through a semiconductor switching circuit shown in FIG. 2. As shown, leads 20 and 21 leading from suitable disconnect switches (not shown) are connected to a primary winding 22 of a control power transformer 23 and to a full wave controlled rectifier circuit comprising SCRs 24, 25, 26 and 27. Current flows during selected half cycles from the power line 20 (or 21) through SCR 24 (or 25), a diode 28 serving as a current detector, through coils of either electromagnets 9, 10 and selector SCR 29 or electromagnets 11, 12 and selector SCR 30, and then through controlled bridge rectifier SCR 26 (or 27) to the power line 21 (or 20). During a major portion the next half cycle following each selected half cycle magnet current flows independently of the power lines 20, 21 through a return path including SCR 31. Then, during the next or a subsequent half cycle the electromagnets are connected to the power line in current opposition to quickly reduce the coil current to zero.

Figure 3:
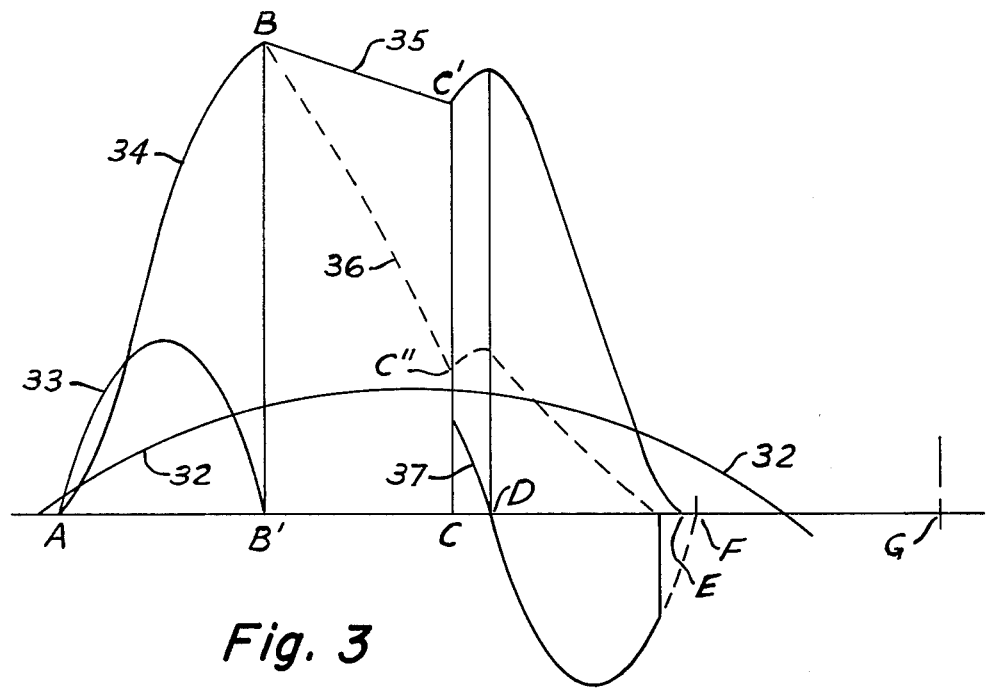
FIG. 3 is a graph showing wave forms of the voltage and current applied to the coils of the electromagnets.

In the preferred mode of operation each energization of an electromagnet consists of three parts and an optional dwell each part lasting approximately a half cycle of the A.C. power. The dwell parts are cancelled as necessary to keep the magnet energizations in step with the mechanical vibration. The sequence is shown in FIG. 3. In this drawing a curve 32 represents the relative velocity of the exciter 5 with respect to the work member 3. Rectifier SCRs 24 and 26 (or 25 and 27) are turned on at point A which is the start of the first half cycle of power line voltage that occurs after a velocity zero point. The available voltage for energizing the magnets is shown by a half sine wave 33. Assuming that the system is calling for full power and that the air gap 13 is a maximum, selector SCR 29 is also turned on so that current flow in the coils of the magnets 9 and 10 builds up as shown by curve 34 from point A to point B during interval A-B. At point B, as the supply voltage goes through zero, the return path SCR 31 is turned on and the current flow supported by the inductance of the magnet shifts from the bridge rectifiers 24, 26 to the SCR 31. The voltage across the magnet coil is then equal to the sum of the voltage drops across the SCR 31 and the diode 28. From point B, the start of the second half cycle of power, the current flows decays slowly along curve 35 to point C' if there is little or no vibration, or along curve 36 to point C" if there is nearly full stroke vibration.

At point C, near the end of the second half cycle of power, the bridge rectifier SCRs 25 (or 24) and 27 (or 26) are turned on. This applies positive voltage to the magnet coils, as indicated by voltage curve 37, to commutate the return SCR 31. Then, in the third half cycle starting at point D, as the voltage reverses, the applied voltage opposes the current flow and the current drops to zero at or near point E. With the phasing of the velocity curve as shown, nothing happens during the fourth half cycle, the optional dwell period, from point F to point G.

Since a half cycle of vibration takes less than four half cycles of the A.C. power, the phase of the velocity advances until the zero crossing shown in the interval F - G advances into the interval D - F. When this occurs, for this cycle, the dwell from F to G is cancelled and the next magnet energization starts in the next half cycle. If there is no vibration, as when starting from rest, every second F-G interval is cancelled. By thus cancelling the dwell interval according to the phase of the mechanical vibration the power drawn from the power line is maintained in synchronism with the mechanical vibration and practically all of the force of the magents is used to overcome the losses in the system.

TIMING CIRCUITS

Figure 7:
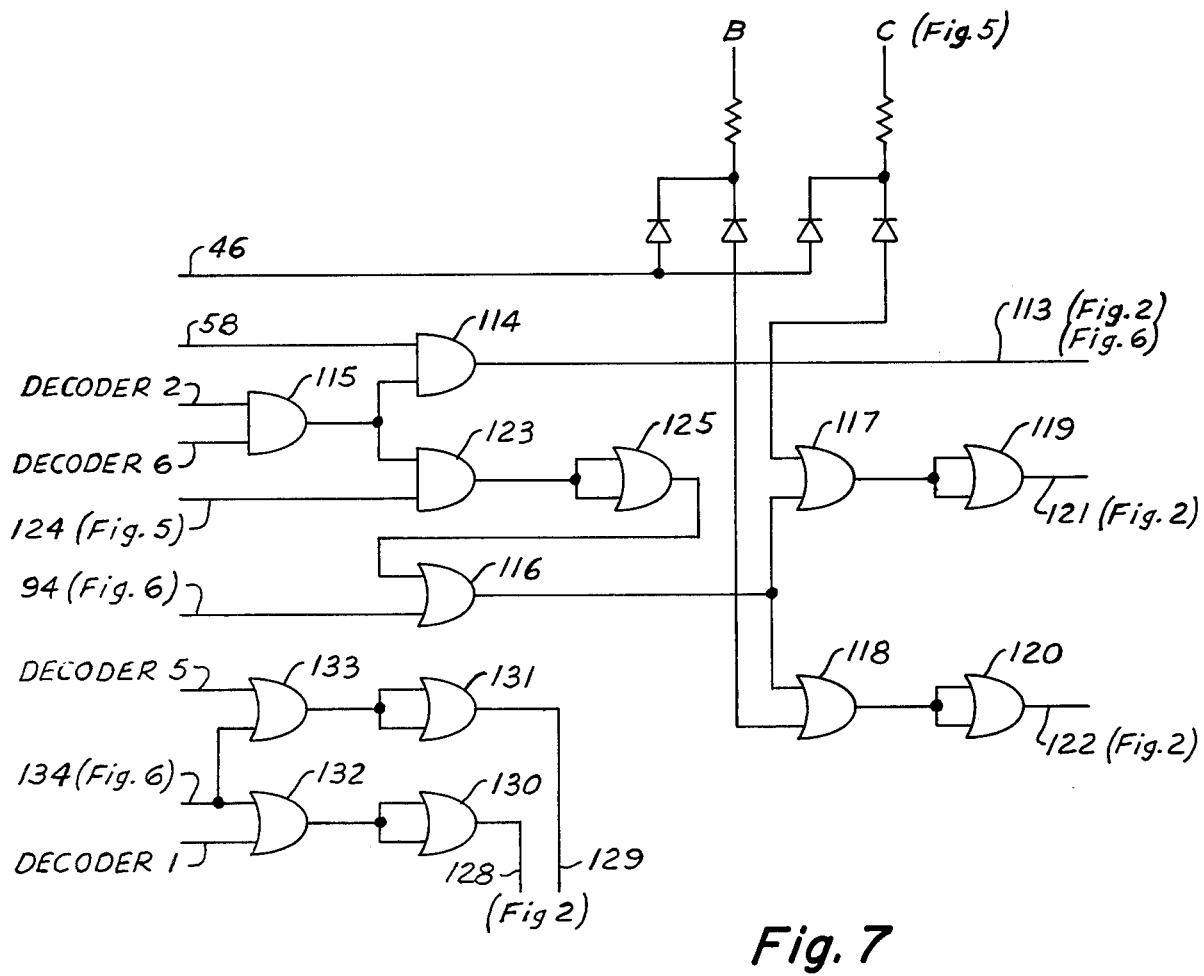
FIG. 7 is a circuit diagram of the gating circuits that control the semiconductor switching circuits according to signals from the logic circuits.
Figure 4:
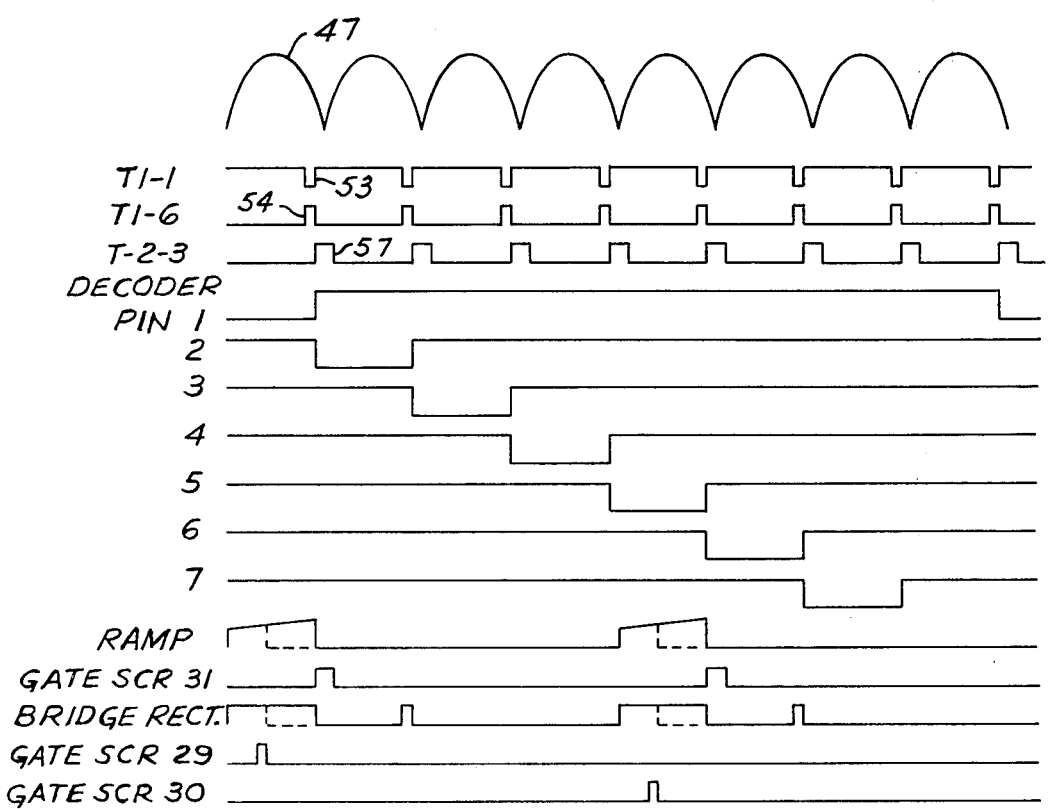
FIG. 4 is a timing diagram for the logic circuits of the control.

The timing of the events in the various control circuits to provide the described operation is shown in a timing diagram, FIG. 4. Briefly, the logic circuits whose timing is illustrated include two monostable multivibrators, a divide by eight counter, a decoder, a number of operational amplifiers and a number of gates as shown in FIGS. 5, 6, and 7.

Figure 5:
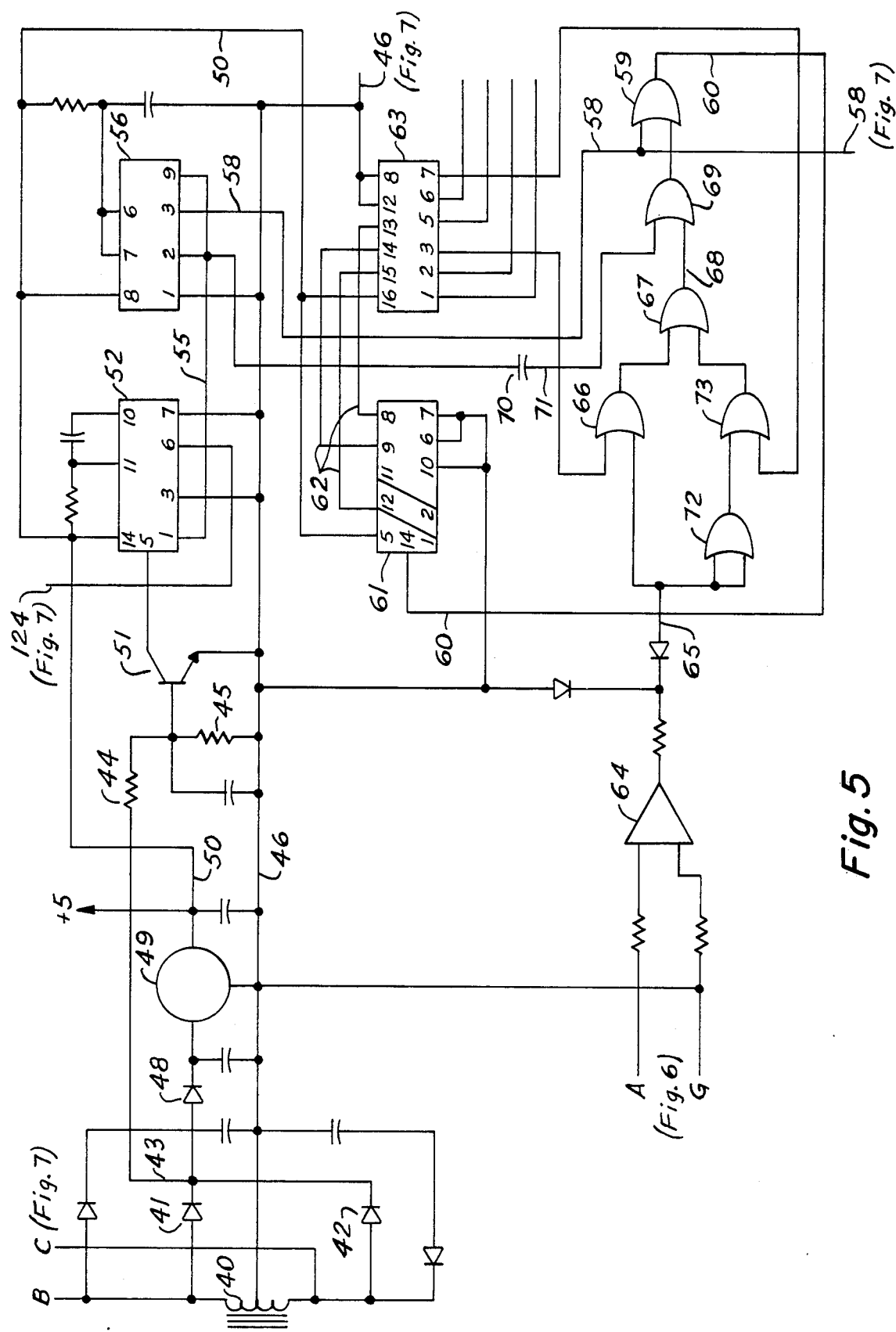
FIG. 5 is a circuit diagram of the timing circuits used in the logic circuits of the control.
Figure 6:
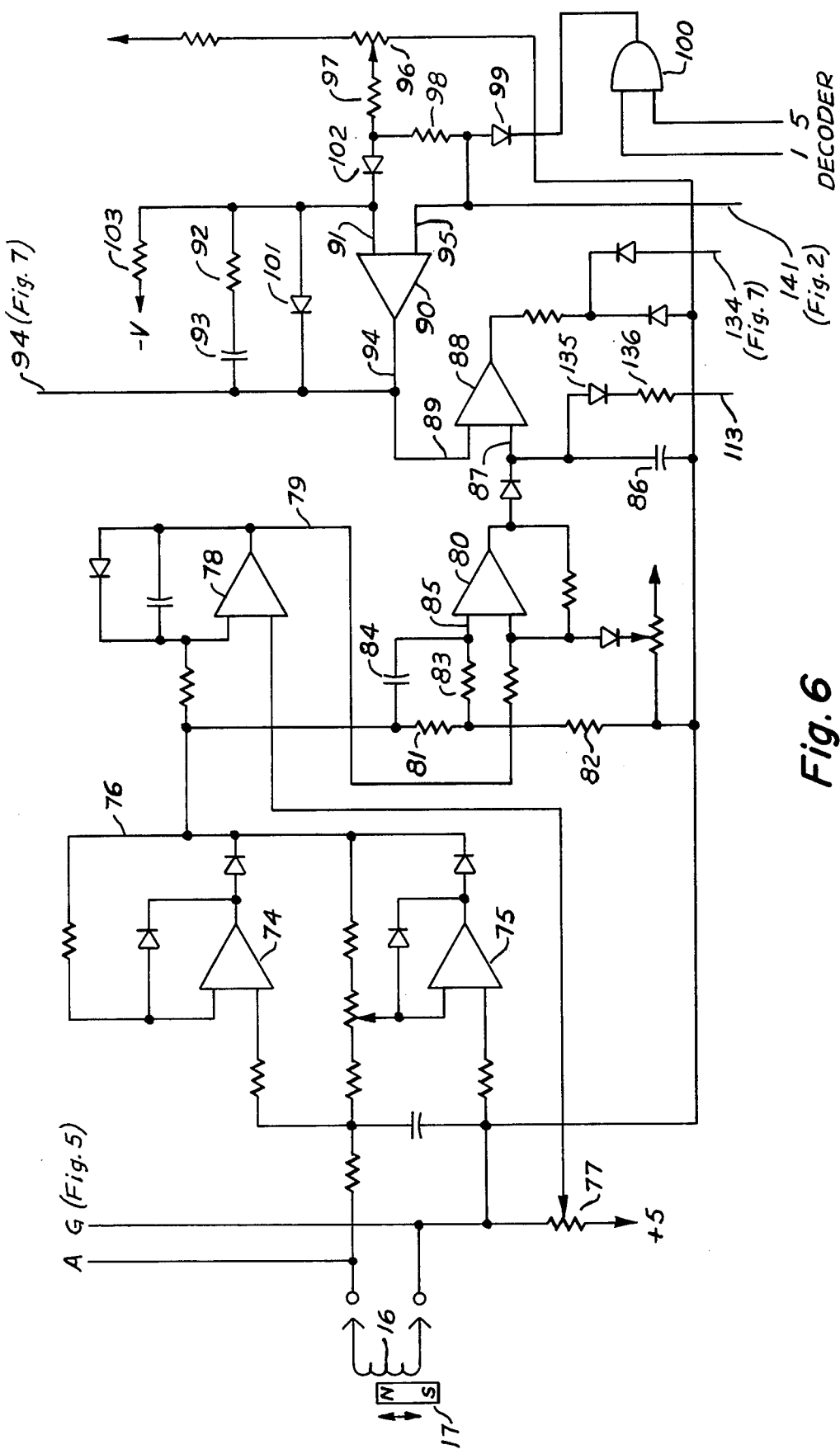
FIG. 6 is a circuit diagram of the amplitude control circuits used in the logic circuits of the control.

Referring to FIG. 5, a centertapped secondary winding 40 of the transformer 23 is connected through diodes 41, 42 to a lead 43 that is connected through resistors 44-45 to a circuit ground lead 46. The voltage on lead 43 is indicated by the top curve 47 in FIG. 4. The lead 43 is also connected through diode 48 and voltage regulator 49 to maintain a positive power lead 50 at five volts, the usual $V_{cc}$ voltage for the logic circuit elements. As the voltage on lead 43 approaches zero toward the end of each half cycle of the A. C. power, and current through resistor 44 decreases a transistor 51 becomes non-conducting to trigger a one shot multivibrator or timer 52, preferably a type 74121, serving as a timer T-1. The timer 52 provides a negative going pulse 53 (FIG. 4 second line) at its output pin 1 and a positive going pulse 54 at its output pin 6, the pulses being about 100 microseconds duration. The negative going pulse is applied though lead 55 to input pins 2 and 4 of a second timer 56, a type 555 timer. This timer 56 provides a positive going pulse 57 of about 700 microseconds duration at its output (pin 3) in response to the negative going input pulse. This pulse, transmitted through lead 58, is inverted in Nor gate 59 and transmitted through lead 60 to the input of a divide-by-eight counter 61.

The counter 61 is a type 7490 decade counter connected to divide by eight. The counter steps forward one count at the leading edge of each of the pulses 57. The counter 61 is connected through leads 62 to a decoder 63. The decoder 63, a type 7442, has a series of output terminals 1, 2, 3, 4, 5, 6, 7, 8 that successively go low as the count in the counter advances through the eight counts. One set of magnets is energized in the 1-4 sequence of counts, the other set in the 5-8 sequence. A low voltage on terminal 1 or 5 corresponds to interval A-B of FIG. 3. A low voltage on terminals 2 or 6 (counts 2 or 6) corresponds to interval B-D of FIG. 3, and a low voltage on terminals 3 or 7 (counts 3 or 7) corresponds to interval D-F of FIG. 3.

As previously mentioned, if the relative velocity, shown as curve 32, goes though zero during interval D-F the interval F-G is cancelled. The cancellation is performed by stepping the counter on the leading edge of the T-1 pulse 53 as well as on the T-2 pulse 57 so that counts 3 and 4 or counts 7 and 8 occur in the same half cycle as the supply voltage. To do this the velocity signal from coil 16 is combined with the decoder signals from terminals 3 or 7 to gate the T-1 pulse to the counter input. Specifically the pickup voltge signal, corresponding to the relative velocity between the vibrating members, is fed through an operational amplifier 64, operating as a voltage comparator, to provide a square wave phase indicating signal on lead 65. If this signal is low during count 3, Nor gate 66 provides a high signal to Nor gate 67 and thus a low signal on lead 68 to Nor gate 69. With lead 68 low gate 69 responds to the negative going leading edge of pulse 53 from timer T-1 transmitted through condensor 70 and lead 71 and transmits a high signal to Nor gate 59. This signal is inverted in gate 59 and appears as a negative going signal applied through lead 60 to the counter 61.

A similar effect occurs during count 7 if the pickup signal at lead 65 is high. In this case the signal is inverted in inverter 72 and combined in gate 73 with the decoder signal from terminal 7 during count 7. The resulting signal is fed through gates 67, 69 and 59 to the input to the counter. Thus, whenever the velocity of the vibratory motion goes though zero, i.e. the ends of the vibratory stroke when one or the other of the air gaps 13 or 14 is a maximum, during the current cutoff interval D-F (FIG. 3) the counter is stepped forward by the T-1 pulse 53 as well as by the T-2 pulse 57 to cancel the dwell interval F-G.

AMPLITUDE CONTROL CIRCUITS

The amplitude of vibration of the work member 3 and exciter 5 is controlled by adjusting the power input to the magnets. The power input is controlled by adjusting, in the intervals A-B of FIG. 3, the time at which the coil selector SCR 29 or 30 is triggered or turned on. In general, this is accomplished by first rectifying the output signal of velocity transducer 15, averaging the rectified output and comparing the average with a command signal to produce a first error signal. Simultaneously, the rectifier output signal is partially differentiated to get an amplitude plus rate of change of amplitude signal, comparing this signal with the first error signal to get a composite error signal and finally comparing the composite error signal with a ramp voltage to convert the composite error signal into a variable time signal for firing the SCRs 29 and 30.

Specifically, the output signal of the transducer coil 16 is fed through a precision full wave rectifier comprising operational amplifiers 74 and 75. Amplifier 74 is connected as a voltage follower arranged to maintain the voltage on output lead 76 precisely equal to the positive half cycles of the signal voltage. Amplifier 75 is an inverting unity gain amplifier arranged to maintain a positive voltage on output lead 76 that, except for sign, is precisely the same as the negative half cycles of the signal voltage. The voltage on output lead 76 is averaged and compared with a command signal from potentiometer 77 in an operational amplifier integrator 78. The output of the integrator 78 appearing on lead 79 is the first error signal which is applied to the inverting input of an operational amplifier 80. At the same time the voltage signal appearing on the rectifier output lead 76 is transmitted through a voltge divider and lead network comprising resistors 81, 82 and 83 and condenser 84 to the non-inverting input 85 of the amplifier 80. The crest voltage at non-inverting input 85 represents the maximum velocity between the members increased or decreased by an amount corresponding to the increase or decrease in maximum velocity since the preceding cycle, i.e. a rate sensing circuit. This voltage and the error signal on lead 79 are combined in the amplifier 80 and used to charge a signal holding condenser 86 during each crest of the transducer signal. The voltage on the signal holding condenser 86 is applied to one terminal 87 of a voltage comparator 88. The signal holding condenser serves to maintain a constant voltage on comparator input terminal 87 during counts 1 to 5 to avoid fluctuations in power with changes in phase between the power voltage and the mechanical vibration. Another terminal 89 of the comparator 88 receives a ramp voltage from a ramp generator amplifier 90.

The ramp generator 90 comprises an operational amplifier having its inverting input 91 connected through the series circuit of resistor 92 and condenser 93 to the amplifier output 94 to supply the ramp voltage to the comparator input 89. Except during counts 1 and 5 noninverting input 95 of amplifier 90 is held low by current flow from a potentiometer 96 through resistors 97 and 98 and diode 99 connected to a gate 100. With the non-inverting input 95 low the output terminal 94 goes low until current flow through a diode 101 connected from inverting input 91 to output 94, draws current through diode 102 to draw the inverting input voltage down to the voltage on the non-inverting input 95.

During decoder intervals 1 and 5, i.e. counts 1 and 5, one or the other input to gate 100 goes low, and the gate output goes high to cut off the current flow through resistor 98. The voltage on input 95, output 94, and input 91 thereupon instantly rises to the voltage of the slider of potentiometer 96. This provides the sharp rise in the ramp signal shown in FIG. 4. In addition, in the ramp circuit current always flows from the inverting input terminal 91 through resistor 103 to a source of negative voltage. With current flow through resistors 97 and 98 stopped this current through resistor 103 is supplied by charging current through condenser 93. This results in a linear rise in voltage, i.e. the ramp voltage, at the amplifier output 94. One or the other of the coil selector SCRs 29 and 30 is fired or turned on when the ramp voltage reaches the voltage on the signal storing condenser 86.

Each of the SCRs is provided with a firing circuit or triggering circuit that is responsive to signals from the logic circuits. These circuits are all alike and are indicated in FIG. 2. The firing circuit for SCR 25 is shown in detail. Each firing circuit includes an optical coupler or opto-isolator 104 and a two stage transistor current amplifier 105 arranged to feed current through the gate-cathode path of the SCR. The opto-isolator 104 comprises a light emitting diode 106 and a photo transistor 107 in a single package. The diode and transistor are elecrtrically insulated from each other so that they may operate at widely different potentials. The photo transistor and the current amplifier 105 are supplied with power from a bridge rectifier 108 and condenser 109 connected to a secondary 110 of the transformer 23. If the cathodes of several SCRs, such as SCRs 24, 25 and 31, are connected together their firing circuits may share a power supply. Otherwise, separate power supplies are required.

THE GATE CIRCUITS

The gate circuits shown in FIG. 7 energize the various firing circuits by connecting the cathodes of the respective light emitting diodes to circuit ground. Thus, to turn on SCR 31, FIG. 2, current is drawn from the five volt supply through resistor 111, light emitting diode 112, lead 113, and gate 114 (FIG. 7). Gate 114 responds to decoder signals for counts 2 and 5 by way of gate 115 and to the T-2 timer pulses 57. Thus SCR 31 is turned on momentarily at point B (FIG. 3). To control the SCRs 24-27 of the bridge rectifier a signal corresponding to the pedestal portion (initial positive going voltage) of the ramp voltage is transmitted through Nor gate 116, combined with power line phase signals in gates 117 or 118, and inverted in inverters 119 and 120, which draw current through leads 121 and 122 and light emitting diodes of the firing circuits of SCRs 24, 26 or 25, 27 as long as there is a ramp voltage and a positive voltge from anode to cathode in the SCRs. These SCRs are also briefly energized during counts 2 and 6 by the T-1 pulse. During the second and sixth counts gate 115 applies a positive or high signal to gate 123. The positive going pulse 54 from T-1 timer 52 is applied to gate 123 through lead 124, then inverted in inverter 125 and transmitted through gate 116 to gates 117 and 118 leading to the firing circuits of SCRs 24-27. This provides the turn-on at point C in the curves in FIG. 3.

Coil selector SCRs 29, 30 have their firing circuits 126, 127 energized through leads 128, 129 from inverters 130, 131 controlled by gates 132, 133. Gate 132 combines the decoder count one signal with the output of the signal comparator 88 received through lead 134 thus firing SCR 29 during the first interval at the proper phasing. Likewise gate 133 combines the decoder count 5 signal with the signal of the comparator 88 to fire SCR 30 at the selected time. Thus each magnet is energized in the half cycle of voltage just after its air gap reaches a maximum length and is closing.

The gate circuit drive for the SCR 31 is also arranged to partially discharge the signal storing condenser 86 through diode 135 and resistor 136 connected to lead 113. Without this partial discharge the signal storing condenser has no discharge path so that the circuit is very slow to respond to a decrease in the amplitude of vibration resulting from an increase in load.

It is undesirable to apply a substantial forward voltage to the magnet coils if they are already carrying current, because this could result in saturation of the magnet iron and excessive coil current. Therefore, the current flow in the magnet coils is sensed and operation of the ramp generator 90 is stayed as long as there is a current flow. In the circuit, the voltge drop across the current sensing diode 28 causes the current flow through resistor 137 to shift from diode 138 to the light emitting diode 139 of opto-isolator 140. The photo sensitive transistor of the isolator 140 then passes current through lead 141 from input 95 of the ramp generator 90 to the circuit ground 46. This keeps the ramp generator 90 in its off condition. A low resistance resistor 142 in parallel with the current sensing diode 28 minimizes the generation of reverse voltages across the current sensing diode 28.

The circuit for the vibrator has been shown and described for operation of the vibrator in the frequency range from 900 to 1200 cycles per minute. Operation in the range from 1200 to 1800 cycles per minute may be obtained by omitting the interval BD, i.e. arranging the counter 61 to count by six by omitting counts 2 and 6. However, elimination of the BD interval substantially reduces the power flow from the power line to the vibrator.

Operation in the frequency range from 720 to 900 cycles per minute is possible by arranging the counter 61 to count by ten, and the gating circuits to delay the triggering pulse for point C (FIG. 3) for a half cycle of the power line voltage. However, this operation requires longer vibratory strokes to accomplish the same conveying speed and the attendant disadvantage of larger air gaps in the magnetic circuits.

The embodiment described is preferred because it represents the best compromise between frequency of operation of the vibrator and its stroke as limited by the air gaps in the drive magnets. Operation of the vibrator as just under one third the power line frequency allows the use of three half cycles of the power line per energization of a magnet and selection of the particular three half cycles for each vibrator cycle to operate the vibrator at its natural frequency. Practically all of the electromagnetically generated force is available and is used to perform work because it is in phase with the relative velocity between the vibrator members.

I claim:

1. In an electromagnetic vibrator comprising a work member to be vibrated, an exciter member, and resilient means connecting the members to form a vibratory system, a drive comprising an electromagnetic motor having a part on each of said members and a control for energizing said motor, said control comprising means for energizing said motor during at least part of a first half cycle of an alternating current power line voltage cycle, means for deenergizing the motor during a subsequent half cycle, and synchronizing means adapted to select as said first half cycle the first half cycle of the power line voltage that starts when said resilient means are near maximum extension in a selected direction.

2. An electromagnetic drive according to claim 1 having two motors one acting in each direction of relative motion between the members, and means for selecting the electromagnet motor to be energized according to the direction of relative motion between the members.

3. In an electromagnetic drive according to claim 1, means for sensing the relative amplitude of vibration of said members, and means responsive to the sensing means controlling the energization of said motor.

4. In an electromagnetic drive according to claim 1, means for maintaining current flow in the motor during at least one half cycle of the line voltage following the energizing half cycle.

5. In an electromagnetic drive according to claim 1, detecting means adapted and arranged to detect current flow in said motor, and means responsive to the detecting means arranged to inhibit energization of the motor during said first half cycle.

6. An electromagnetic vibrator comprising a work member to be vibrated, an exciter member, resilient means connecting the members to form a vibratory system, an electromagnetic motor having a part attached to each member for vibrating said members, said motor parts being separated by an air gap that varies with the vibration of the members, a vibration pickup attached to at least one of said members for generating an electrical signal corresponding to the vibration of the member, semiconductor switching means adapted to connect said electromagnetic motor to an alternating current power line, and logic means connected to and adapted to control said switching means, said logic means being connected to and responsive to said vibration pickup and to the power line and arranged to energize the switching means during at least part of each $n$th half cycle of the power line voltage in the absence of a signal from the pickup and during at least part of the first half cycle of the power line voltage that begins while said air gap is near maximum length in response to signals from said pickup.

7. An electromagnetic vibrator according to claim 6 in which a second semiconductor switching means controlled by said logic means is connected to said motor and arranged to conduct motor current independently of the alternating current power line during at least part of the half cycle next following said $n$th and first half cycles.

8. An electromagnetic vibrator according to claim 6 in which during a half cycle of the power line subsequent to said $n$th and first half cycles, said semiconductor switching connects said motor to the power line in a phase to oppose current flowing in the motor.

* * * * *